(12) United States Patent
Okabe et al.

(10) Patent No.: US 9,159,354 B2
(45) Date of Patent: Oct. 13, 2015

(54) MAGNETIC RECORDING MEDIUM FABRICATION METHOD

(71) Applicant: SHOWA DENKO K.K., Tokyo (JP)

(72) Inventors: Takehiko Okabe, Chiba (JP); Katsuaki To, Chiba (JP)

(73) Assignee: SHOWA DENKO K.K., Tokyo (JP)

( * ) Notice: Subject to any disclaimer, the term of this patent is extended or adjusted under 35 U.S.C. 154(b) by 0 days.

(21) Appl. No.: 14/154,244

(22) Filed: Jan. 14, 2014

(65) Prior Publication Data

US 2014/0212579 A1    Jul. 31, 2014

(30) Foreign Application Priority Data

Jan. 29, 2013  (JP) ................................. 2013-014715

(51) Int. Cl.
*G11B 5/84*    (2006.01)

(52) U.S. Cl.
CPC .................................. *G11B 5/8408* (2013.01)

(58) Field of Classification Search
None
See application file for complete search history.

(56) References Cited

U.S. PATENT DOCUMENTS

| | | | |
|---|---|---|---|
| 4,671,999 A * | 6/1987 | Burguette et al. | 428/835.8 |
| 5,846,328 A | 12/1998 | Aruga et al. | |
| 6,627,302 B1 * | 9/2003 | Tang et al. | 428/212 |
| 7,155,115 B2 | 12/2006 | Cord | |
| 7,440,233 B2 | 10/2008 | Takahashi | |
| 2004/0213951 A1 * | 10/2004 | Shimokawa et al. | 428/65.8 |

FOREIGN PATENT DOCUMENTS

| | | |
|---|---|---|
| JP | 08-274142 | 10/1996 |
| JP | 2004-002971 | 1/2004 |
| JP | 2006-147012 | 6/2006 |

OTHER PUBLICATIONS

Dupont, Krytox data sheet, downloaded Feb. 6, 2015; evidentiary.*

* cited by examiner

*Primary Examiner* — Joseph Miller, Jr.
(74) *Attorney, Agent, or Firm* — IPUSA, PLLC (57) ABSTRACT

A method of fabricating a magnetic recording medium by sequentially forming a magnetic recording layer, a protection layer, and a lubricant layer on a stacked body, includes forming the lubricant by depositing a first lubricant on the stacked body after forming the protection layer, by vapor-phase lubrication deposition, without exposing the stacked body to atmosphere, and depositing a second lubricant that is dissolved in an organic solvent onto the stacked body after depositing the first lubricant.

9 Claims, 3 Drawing Sheets

MAGNETIC RECORDING MEDIUM FABRICATION METHOD

CROSS-REFERENCE TO RELATED APPLICATIONS

This application is based upon and claims the benefit of priority of the prior Japanese Patent Application No. 2013-014715 filed on Jan. 29, 2013, the entire contents of which are incorporated herein by reference.

BACKGROUND OF THE INVENTION

1. Field of the Invention

The present invention relates to a magnetic recording medium fabrication method.

2. Description of the Related Art

Recently, a magnetic storage apparatus may be provided in various products, including a personal computer, a video recorder, a data server, and the like, and the importance of the magnetic storage apparatus is increasing. The magnetic storage apparatus includes a magnetic recording medium that magnetically stores electronic data by magnetic recording. Examples of the magnetic storage apparatus include a magnetic disk drive, a flexible disk drive, a magnetic tape apparatus, and the like. A HDD (Hard Disk Drive) is an example of the magnetic disk drive.

For example, a general magnetic recording medium has a multi-layer stacked structure including an underlayer, an intermediate layer, a magnetic recording layer, and a protection layer that are deposited in this sequence on a nonmagnetic substrate, and a lubricant layer coated on a surface of the protection layer. In order to prevent mixing of impurities between the layers forming the magnetic recording medium during fabrication of the magnetic recording medium, an in-line vacuum deposition apparatus is used to continuously stack the layers under decompression, as described in Japanese Laid-Open Patent Publication No. 8-274142, for example.

In the in-line vacuum deposition apparatus, a plurality of deposition chambers having a deposition means capable of depositing a layer on the substrate are connected via a gate valve, together with a chamber for carrying out a thermal process and an auxiliary chamber, are provided in order to form a single deposition line. When the substrate is set on a carrier and passes through the deposition line, the layers are successively deposited on the substrate to fabricate the magnetic recording medium having the desired structure.

Generally, the deposition line is arranged in a ring shape, and a substrate loading and unloading chamber is provided in the deposition line in order to load and unload the substrate with respect to the carrier. The carrier, which passes through the deposition chambers of the deposition line, reaches the substrate loading and unloading chamber where the substrate having the layers deposited thereon is unloaded from the carrier. In addition, after removing the substrate from the carrier, a new substrate to be subjected to the deposition is loaded onto the carrier in the substrate loading and unloading chamber.

In addition, as a method of forming the lubricant layer on the surface of the magnetic recording medium, a vapor-phase lubrication has been proposed in Japanese Laid-Open Patent Publication No. 2004-002971, for example. The vapor-phase lubrication places the magnetic recording medium within a vacuum chamber, and introduces gas lubricant into the vacuum chamber.

When fabricating the magnetic recording medium having the multi-layer stacked structure using the in-line vacuum deposition apparatus, the magnetic recording layer is formed by sputtering using the vacuum deposition apparatus, the protection layer is formed by ion-beam deposition using the vacuum deposition apparatus, and the lubricant layer is formed by vapor-phase lubrication using the vacuum deposition apparatus, for example. Hence, the deposition processes from the formation of the magnetic recording layer up to the formation of the lubricant layer may be performed without exposing a stacked body to the atmosphere.

In addition, a magnetic recording medium having a lubricant layer formed by two layers has been proposed in Japanese Laid-Open Patent Publication No. 2006-147012, for example. The lubricant layer of this proposed magnetic recording medium is formed by a fixing layer (or bond layer) that is provided on the side of the protection layer, is chemically stable, and has a suitable bond with respect to the protection layer, and a fluid (or free layer) that is provided on the surface side of the magnetic recording medium and is mainly made of a material having a low coefficient of friction.

When the contact between the magnetic recording medium and the magnetic head is taken into consideration, the coefficient of friction of the lubricant layer is preferably low. On the other hand, when a corrosion resistance of the magnetic recording medium is taken into consideration, a coverage of the surface of the protection layer provided by the lubricant layer is preferably high.

SUMMARY OF THE INVENTION

Embodiments of the present invention may provide magnetic recording medium fabrication method that can simultaneously obtain a low coefficient of friction of the lubricant layer and a high coverage of the surface of the protection layer by the lubricant layer.

According to one aspect of the present invention, a method of fabricating a magnetic recording medium by sequentially forming a magnetic recording layer, a protection layer, and a lubricant layer on a stacked body, may include forming the lubricant, wherein the forming the lubricant includes depositing a first lubricant on the stacked body after forming the protection layer, by vapor-phase lubrication deposition, without exposing the stacked body to atmosphere, and depositing a second lubricant that is dissolved in an organic solvent onto the stacked body after depositing the first lubricant.

Other objects and further features of the present invention will be apparent from the following detailed description when read in conjunction with the accompanying drawings.

DESCRIPTION OF THE PREFERRED EMBODIMENTS

A description will be given of the magnetic recording medium fabrication method in each embodiment of the present invention, by referring to the drawings.

According to studies conducted by the present inventors, when the processes to form the magnetic recording layer up to the lubricant layer of the magnetic recording medium are carried out continuously without exposing the stacked body to the atmosphere (or non-enclosed environment open to air), it was found that a ratio (or bonded ratio) of the bond layer included in the lubricant layer may be made close to 100% depending on the kind of lubricant that is used. However, according to studies conducted by the present inventors, the 100% bonded ratio of the lubricant layer is not always the optimum value. From the standpoint of reducing the coefficient of friction when the magnetic recording medium and the magnetic head make contact, the lubricant layer preferably includes a suitable free layer. On the other hand, from the standpoint of increasing the corrosion resistance of the magnetic recording medium, the coverage of the surface of the protection layer provided by the lubricant layer is preferably high.

Hence, as will be described hereunder, the present inventors have conceived a magnetic recording medium fabrication method and a magnetic recording medium fabrication apparatus that increase the bonded ratio of the lubricant layer with respect to the surface of the protection layer within an appropriate range, in order to include a suitable free layer in the lubricant layer and to increase the coverage of the surface of the protection layer provided by the lubricant layer, simultaneously.

The lubricant layer of the magnetic recording medium is required to have a chemically stable bond layer with a strong bond (that is, a high bonded ratio) with respect to the protection layer on the side of the protection layer, and a free layer mainly made of a material having a low coefficient of friction on the surface side of the magnetic recording medium. In other words, the lubricant layer includes the bond layer provided on the protection layer, and the free layer provided on the bond layer. The bond layer may be formed with ease using the vapor-phase lubrication deposition. However, it may be difficult to increase the coverage of the surface of the protection layer provided by the lubricant, and to include a suitable free layer in the lubricant layer, simultaneously. In other words, the lubricant layer of the magnetic recording medium having such characteristics is in many cases formed using a special lubricant or a mixture of special lubricants, however, such special lubricants are difficult to deposit using the vapor-phase lubrication deposition. In other words, only compounds having a low molecular mass and a low boiling point may be vaporized and deposited first. In addition, when a heating temperature is set high in order to simultaneously vaporize the compounds, decomposition or thermal polymerization of a part of the compounds included in the lubricant may occur, to transform such parts into another compound.

On the other hand, in the magnetic recording medium fabrication method in one embodiment, a first lubricant is deposited on the stacked body using the vapor-phase lubrication deposition, and a second lubricant that is dissolved in an organic solvent is thereafter deposited on the stacked body. For this reason, the compound included in the lubricant layer and having a weak bond with respect to the protection layer is flushed by the organic solvent, in order to positively include the second lubricant in the lubricant layer. As a result, it is possible to form a lubricant layer that includes a bond layer and a free layer to a suitable extent.

In addition, in the magnetic recording medium fabrication method in one embodiment, the process of forming the second lubricant on the stacked body may be a process of substituting a part of or the entire first lubricant deposited on the stacked body by the second lubricant, that is, substituting the first lubricant in part or in its entirely by the second lubricant. As described above, the material suitable for deposition by the vapor-phase lubrication deposition preferably has a low molecular mass and a narrow molecular mass range. However, the material having such physical properties does not necessarily match the compound that is preferably used for the lubricant layer of the magnetic recording medium. In other words, in the magnetic recording medium, the lubricant layer is not only required to have a high bonded ratio with respect to the protection layer, but is also required to provide a high coverage with respect to the surface of the protection layer.

Accordingly, a lubricant layer that includes a suitable free layer and has a sufficiently high bonded ratio and a sufficiently high coverage can be formed by using, for the second lubricant, a compound that has a high coverage with respect to the surface of the protection layer and is able to form a suitable free layer, and substituting a part of or the entire first lubricant formed on the stacked body by the second lubricant.

The process of substituting a part of or the entire first lubricant by the second lubricant may be performed after the process of depositing the first lubricant on the stacked body, by depositing the second lubricant dissolved in the organic solvent on the first lubricant deposited on the stacked body. This process of substituting a part of or the entire first lubricant by the second lubricant may be carried out by dipping, spin-coating, or the like.

In a case in which the dipping is employed, the stacked body having formed thereon each of the layers up to the protection layer is dipped into a solution for forming the lubricant layer (hereinafter also referred to as a "lubricant layer-forming solution"), within a dipping bath of a dip-coating apparatus, for example. Thereafter, the stacked body is lifted from the dipping bath at a predetermined velocity, in order to coat the lubricant layer-forming solution on the surface of the protection layer on the stacked body.

In a case in which the spin-coating is employed, the lubricant layer-forming solution is sprayed onto the surface of the stacked body from a nozzle, for example. Thereafter, the stacked body is rotated at a high speed in order to drain the excess solution and coat the lubricant on the stacked body.

For example, a fluorocarbon solvent, such as Vertrel XF (product name) manufactured by Du Pont-Mitsui Fluorochemicals Co., Ltd., or the like, may be used for the lubricant layer-forming solution. A rate of substitution of the first lubricant by the second lubricant may be changed by changing a mixture ratio of the solvent and the second lubricant. More particularly, the rate of substitution of the first lubricant by the second lubricant increases as the mixture ratio of the second lubricant included in the lubricant layer-forming solution increases.

In addition, the rate of substitution of the first lubricant by the second lubricant may also be changed depending on the kind of organic solvent that is used for the solvent for forming the lubricant layer. More particularly, the rate of substitution of the first lubricant by the second lubricant increases as the dissolving power of the first lubricant with respect to the organic solvent increases relative to the second lubricant.

In the magnetic recording medium fabrication method in one embodiment, a molecular mass of a compound included in the second lubricant is preferably higher than a molecular mass of a compound included in the first lubricant, in order to form a highly reliable lubricant layer. A lubricant that includes a compound having a high molecular mass has a high boiling point, and the lubricant layer formed by such a lubricant can have a high stability even at a high temperature. However, such a lubricant has a high viscosity, making it difficult to uniformly deposit the lubricant. More particularly, when the thickness of the lubricant layer is reduced, the lubricant layer may be formed in a checkerboard pattern to form islands of the lubricant. Accordingly, the molecular mass of the compound included in the first lubricant is set lower than the molecular mass of the second lubricant, in order to increase the coverage of the first lubricant with respect to the surface of the stacked body, and thereafter, the first lubricant is substituted by the second lubricant, in order to increase the coverage of the lubricant layer as a whole with respect to the surface of the stacked body.

Moreover, in the magnetic recording medium fabrication method in one embodiment, the first lubricant is preferably a diol having a molecular mass in a range of 500 to 2000. By using such a compound for the first lubricant, the coverage of (1)

the surface of the stacked body provided by the first lubricant can be increased. Diol is a generic name for an aliphatic compound or an alicyclic compound in which two (2) hydroxyl groups are bonded to two (2) different carbons, and may include the following compound, for example. In the following formula, p and q denote integers, and the number average molecular mass is 500 to 2000.

In the magnetic recording medium fabrication method in one embodiment, the second lubricant is preferably a tetraol having a molecular mass in a range of 1500 to 5000. Such a compound easily substitutes the first lubricant, and thus, the substitution of the first lubricant by the second lubricant can be promoted. In addition, a part of tetraol has the effect of forming the free layer. Tetraol is a generic name for an aliphatic compound or an alicyclic compound in which four (4) hydroxyl groups are bonded to four (4) different carbons, and may include the following compound, for example. In the following formula, p and q denote integers, and the number average molecular mass is 1500 to 5000.

In the magnetic recording medium fabrication method in one embodiment, a plurality of compounds are preferably used for the second lubricant. More particularly, a compound that easily substitutes the first lubricant, and a compound that easily forms the free layer are preferably used for the second lubricant. A description will be given of particular examples of a plurality of compounds A through C.

A. A lubricant that is a mixture of tetraol and diol may be represented by the following formulas.

where p and q denote integers, and the number average molecular mass is 500 to 2000.

where p and q denote integers, and the number average molecular mass is 1500 to 5000.

B. A lubricant may include a compound A represented by the following general formula (1), and a compound $B_1$ represented by the following general formula (2) or a compound $B_2$ represented by the following general formula (3), where a mass ratio $(A/B_1)$ of the compound $B_1$ with respect to the compound A, or a mass ratio $(A/B_2)$ of the compound $B_2$ with respect to the compound A, is within a range of 0.05 to 0.3.

(2)

(3)

In the generalized formula (1) above, x is an integer from 1 to 5, $R_1$ denotes one of a hydrogen atom, alkyl group having 1 to 4 carbons, or halogenated alkyl group having 1 to 4 carbons, and $R_2$ denotes a substituent of an end group —$CH_2OH$ or —$CH(OH)CH_2OH$. In the generalized formula (2) above, q is an integer in a range of 4 to 60. In the generalized formula (3), r is an integer in a range of 4 to 36, and s is an integer in a range of 4 to 36.

C. A lubricant may include a compound A represented by the following general formula (4), and a compound B that is selected from a compound $B_1$ represented by the following general formula (5), a compound $B_2$ represented by the following general formula (6), a compound $B_3$ represented by the following general formula (7), and a compound $B_4$ represented by the following general formula (8), where a mass ratio (A/B) of the compound B with respect to the compound A is within a range of 0.05 to 0.9.

(4)

(5)

(6)

(7)

(8)

In the generalized formula (4) above, x is an integer from 1 to 5, $R_1$ denotes one of a hydrogen atom, alkyl group having 1 to 4 carbons, or halogenated alkyl group having 1 to 4 carbons, and $R_2$ denotes a substituent of an end group —$CH_2OH$ or —$CH(OH)CH_2OH$. In the generalized formula (5) above, m is an integer in a range of 4 to 60. In the generalized formula (6), n is an integer in a range of 4 to 36. In the generalized formula (7), r is an integer in a range of 4 to 60. In the generalized formula (8), a, b, c, and d are integers in a range of 4 to 36.

In the magnetic recording medium fabrication method and apparatus in one embodiment, the bonded ratio between the protection layer and the lubricant layer is preferably in a range of 60% to 99% (that is, the percentage of the free layer is 40% to 1%). In other words, by including a suitable free layer in the lubricant layer, a coefficient of friction for a case in which the magnetic recording medium and the magnetic head make contact with each other may be reduced. The bonded ratio may be measured by dipping the magnetic recording medium formed with the lubricant layer in a fluorocarbon solvent for five (5) minutes, and measuring the absorbance in a vicinity of 1270 $cm^{-1}$ at the same position on the same medium before and after the dipping using ESCA (Electron Spectroscopy for Chemical Analysis). The bonded ratio may be defined as a percentage of the ratio of the absorbances before and after the dipping, that is, by [{(Absorbance After Dipping)/(Absorbance Before Dipping)}×100]. For example, the fluorocarbon solvent may be Vertrel XF (product name) manufactured by Du Pont-Mitsui Fluorochemicals Co., Ltd., or other similar products.

Next, a description will be given of an example of the magnetic recording medium fabrication method that forms the magnetic recording layer, the protection layer, and the lubricant layer in this sequence on the stacked body.

Figure 1:
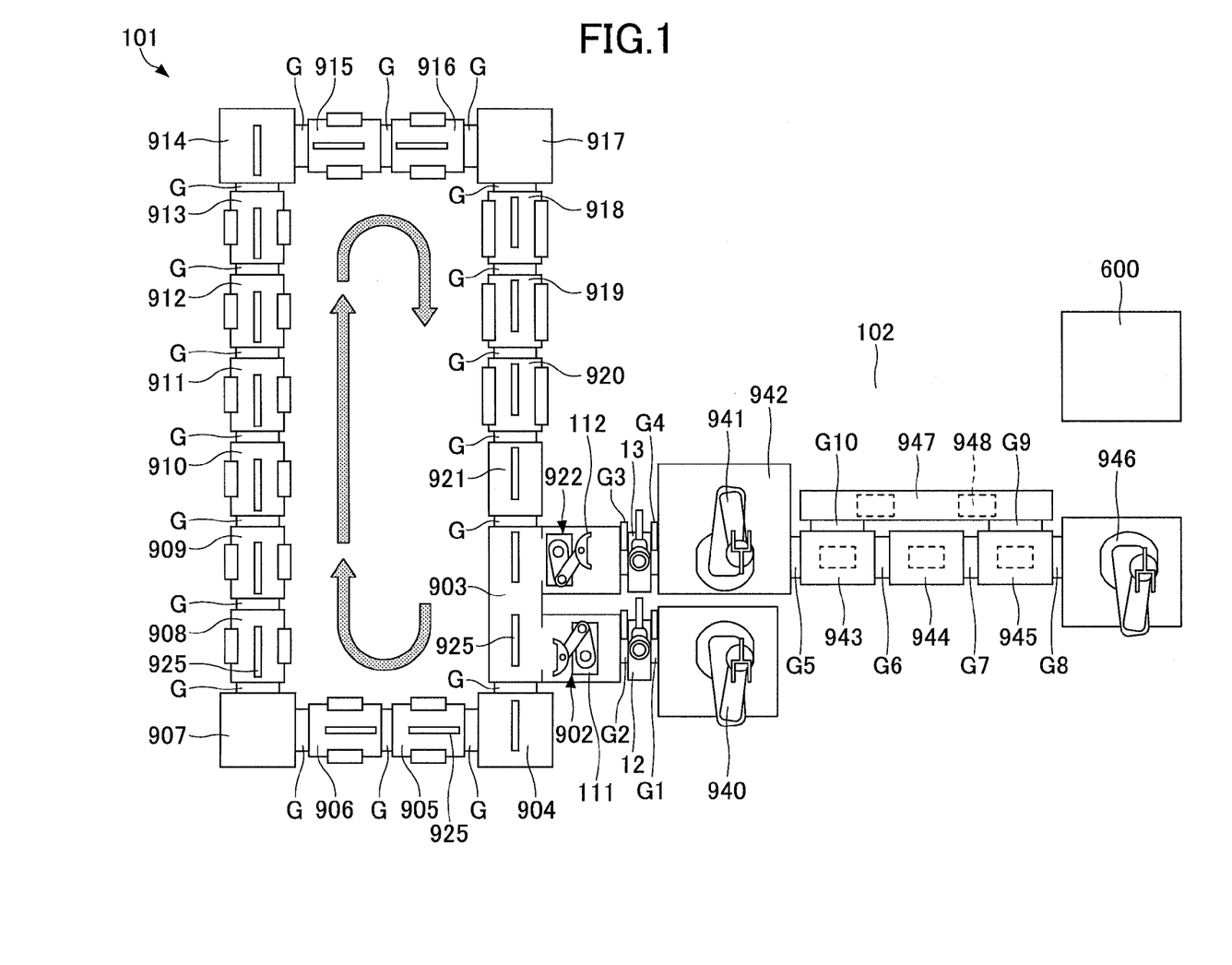
FIG. 1 is a schematic diagram illustrating an example of a magnetic recording medium fabrication apparatus in one embodiment of the present invention.

FIG. 1 is a schematic diagram illustrating an example of the magnetic recording medium fabrication apparatus in one embodiment of the present invention. The magnetic recording medium fabrication apparatus illustrated in FIG. 1 may include a deposition apparatus 101 configured to form the layers of the magnetic recording medium up to the protection layer, and a vapor-phase lubrication deposition apparatus 102 configured to form the lubricant layer on the surface of the protection layer.

The deposition apparatus 101 may include a substrate loading and unloading chamber 903, a first corner chamber 904, a first process chamber 905, a second process chamber 906, a second corner chamber 907, a third process chamber 908, a fourth process chamber 909, a fifth process chamber 910, a sixth process chamber 911, a seventh process chamber 912, an eighth process chamber 913, a third corner chamber 914, a ninth process chamber 915, a tenth process chamber 916, a fourth corner chamber 917, an eleventh process chamber 918, a twelfth process chamber 919, a thirteenth process chamber 920, and an auxiliary chamber 921 that are connected in a ring shape via inter-chamber gate valves G. Each of the chambers 903 through 921 is surrounded by a plurality of partitioning walls, and includes an internal space that may be put into a decompression state.

The inter-chamber gate valve G, which may freely open and close at a high speed, may be provided between two mutually adjacent chambers (for example, the chambers 905 and 906). All of the gate valves G are opened and closed at the same timing. Hence, each of a plurality of carriers 925 that transport substrates (not illustrated) may move from one to the other of the mutually adjacent chambers with regularity.

Each of the first through thirteenth process chambers 905, 906, 908 through 913, 915, 916, and 918 through 920 may be provided with a substrate heating means (or substrate heater), a deposition means (or deposition part), a process gas supplying means (or process gas supplying part), an exhaust means (or exhaust part), and the like. The deposition means may be formed by a sputtering apparatus, an ion beam deposition apparatus, or the like. The gas supplying means and the exhaust means may cause the process gas to flow when necessary.

For example, the first process chamber 905 to the tenth process chamber 916 may be used to form the magnetic recording layer of the magnetic recording medium, and the eleventh and twelfth process chambers 918 and 919 may be used to form the protection layer. A process gas pressure within the eleventh and twelfth process chambers 918 and 919 is P1. In this example, the thirteenth process chamber 920 is used as an auxiliary chamber.

A base pressure (or reaching pressure) of each of the first through thirteenth process chambers 905, 906, 908 through 913, 915, 916, and 918 through 920 may be set to $1\times10^{-5}$ Pa, for example.

The corner chambers 904, 907, 914, and 917 may be arranged at corners of the magnetic recording medium deposition apparatus 101, and change the orientation of the carrier 925 in accordance with a moving direction of the carrier 925. The inside of each of the corner chambers 904, 907, 914, and 917 may be set to high vacuum, and each of the corner chambers 904, 907, 914, and 917 may rotate the carrier 925 in a decompression state.

As illustrated in FIG. 1, the substrate loading and unloading chamber 903 is arranged between the first corner chamber 904 and the auxiliary chamber 921. The internal space of the substrate loading and unloading chamber 903 may be larger than that of other chambers. Two (2) carriers 925 may be arranged within the substrate loading and unloading chamber 903, such that the substrate is loaded onto one carrier 925 and the substrate is unloaded from another carrier 925. Each of the carriers 925 may be transported simultaneously in a direction indicated by arrows in FIG. 1. The substrate loading and unloading chamber 903 may be connected to a substrate input chamber 902 and a substrate output chamber 922.

A vacuum robot 111 may be arranged within the substrate input chamber 902, and another vacuum robot 112 may be arranged within the substrate output chamber 922. The vacuum robots 111 and 112 are examples of a transport apparatus. The substrate input chamber 902 may load the substrate onto the carrier 925 within the substrate loading and unloading chamber 903, using the vacuum robot 111. In addition, the substrate output chamber 922 may unload the substrate from the carrier 925 within the substrate loading and unloading chamber 903, using the vacuum robot 112.

The substrate input chamber 902 may be connected to an airlock chamber 12 via an inter-chamber gate valve G2. The substrate output chamber 922 may be connected to an airlock chamber 13 via an inter-chamber gate valve G3. A plurality of substrates (for example, 50 substrates) may be accommodated within each of the airlock chambers 12 and 13. Each of the airlock chambers 12 and 13 may have a function to exchange the accommodated substrates at both ends of the chamber. The operation of each of the airlock chambers 12 and 13 may be a repetition of the process described hereunder.

(Input of Substrate to Deposition Apparatus)

The input of the substrate to the deposition apparatus 101 may be carried out by the process including the following steps s1 through s8.

Step s1: Gate values G1 and G2 are closed.

Step s2: The inside of the airlock chamber 12 is set to atmospheric pressure.

Step s3: The gate valve G1 is opened.

Step s4: The plurality of substrates (for example, 50 substrates) are input to the airlock chamber 12 by a substrate input robot 940 which is an example of a transport apparatus.

Step s5: The gate valve G1 is closed.

Step s6: The inside of the airlock chamber 12 is decompressed to vacuum.

Step s7: The gate valve G2 is opened.

Step s8: The substrate within the airlock chamber 12 is loaded onto the carrier 925 within the substrate loading and unloading chamber 903 by the vacuum robot 111.

(Output of Stacked Body from Deposition Apparatus and Input of Stacked Body to Vapor-Phase Lubrication Deposition Apparatus)

The output of the stacked body from the deposition apparatus 101 and the input of the stacked body to the vapor-phase lubrication deposition apparatus 102 may be carried out by the process including the following steps s11 through s18.

Step s11: The gate valves G3 and G4 are closed.

Step s12: The inside of the airlock chamber 13 is decompressed to vacuum.

Step s13: The gate valve G3 is opened.

Step s14: The substrate is removed from the carrier 925 within the substrate loading and unloading chamber 903, and set within the airlock chamber 12, using the vacuum robot 112.

Step s15: The gate valve G3 is closed when the inside of the airlock chamber 12 becomes full of substrates (for example, 50 substrates are set).

Step s16: The inside of the airlock chamber 13 is decompressed to vacuum.

Step s17: The gate valve G4 is opened.

Step s18: The substrates (for example, 50 substrates) within the airlock chamber 12 are input to the vapor-phase lubrication deposition apparatus 102 using a vacuum robot 941 provided within a vacuum container 942. The vacuum robot 941 is an example of a transport apparatus.

Returning now to the description of FIG. 1, the vapor-phase lubrication deposition apparatus 102 may include the isolation chamber 943 to be filled with the inert gas, a vapor-phase lubrication process chamber 944, an airlock chamber 945, and a transport cassette return path chamber 947 that are connected via gate valves G6, G7, G9, and G10. A substrate output robot 946 for outputting the stacked body formed with the lubricant layer may be provided adjacent to the airlock chamber 945 via a gate valve G8. The substrate output robot 946 is an example of the transport apparatus. A transport cassette 948 configured to transport a plurality of stacked bodies (for example, 50 stacked bodies) may be transported amongst each of the chambers 943 through 945, and 947. The plurality of stacked bodies output from the substrate output robot 946 may be supplied to a lubricant coating apparatus 600 that uses the second lubricant dissolved in the organic solution.

The stacked bodies (hereinafter also referred to as "substrates") within the vapor-phase lubrication deposition apparatus 102 may move so that the following processes are repeated, and processes including the following steps s21 through s39 may be performed continuously.

Step s21: The gate valves G5 and G6 are closed.

Step s22: The inside of the isolation chamber 943 are decompressed to vacuum.

Step s23: The gate valve G5 is opened.

Step s24: The substrates (for example, 50 substrates) within the airlock chamber 12 are inserted into the transport cassette 948 within the isolation chamber 943 using the vacuum robot 941.

Step s25: The gate valve G5 is closed.

Step s26: An inert gas is supplied into the isolation chamber 943 to generate the gas pressure (or internal pressure) P3.

Step s27: The gate valve G6 is opened.

Step s28: The transport cassette 948 within the isolation chamber 943 is supplied into the vapor-lubrication process chamber 944.

Step s29: The lubricant layer is formed on the stacked body within the transport cassette 948 within the vapor-lubrication process chamber 944.

Step s30: The gate valve G7 is opened, and the transport cassette 948 accommodating the stacked body having the lubricant layer formed thereon is moved to the airlock chamber 945.

Step s31: The gate valve G7 is closed.

Step s32: The inside of the airlock chamber 945 is set to atmospheric pressure.

Step s33: The gate valve G8 is opened.

Step s34: The stacked body subjected to the process is extracted by the substrate output robot 946.

Step s35: The gate valve G8 is closed.

Step s36: The inside of the airlock chamber 945 is decompressed to vacuum.

Step s37: The gate valve G9 is opened.

Step s38: The empty transport cassette 948 is moved to the isolation chamber 943 via the return path chamber 947. The inside of the return path chamber 947 is decompressed to vacuum in this state.

Step s39: The gate valve G10 is opened in the decompression state of the isolation chamber 943, and the empty transport cassette 948 is supplied into the isolation chamber 943.

Figure 2:
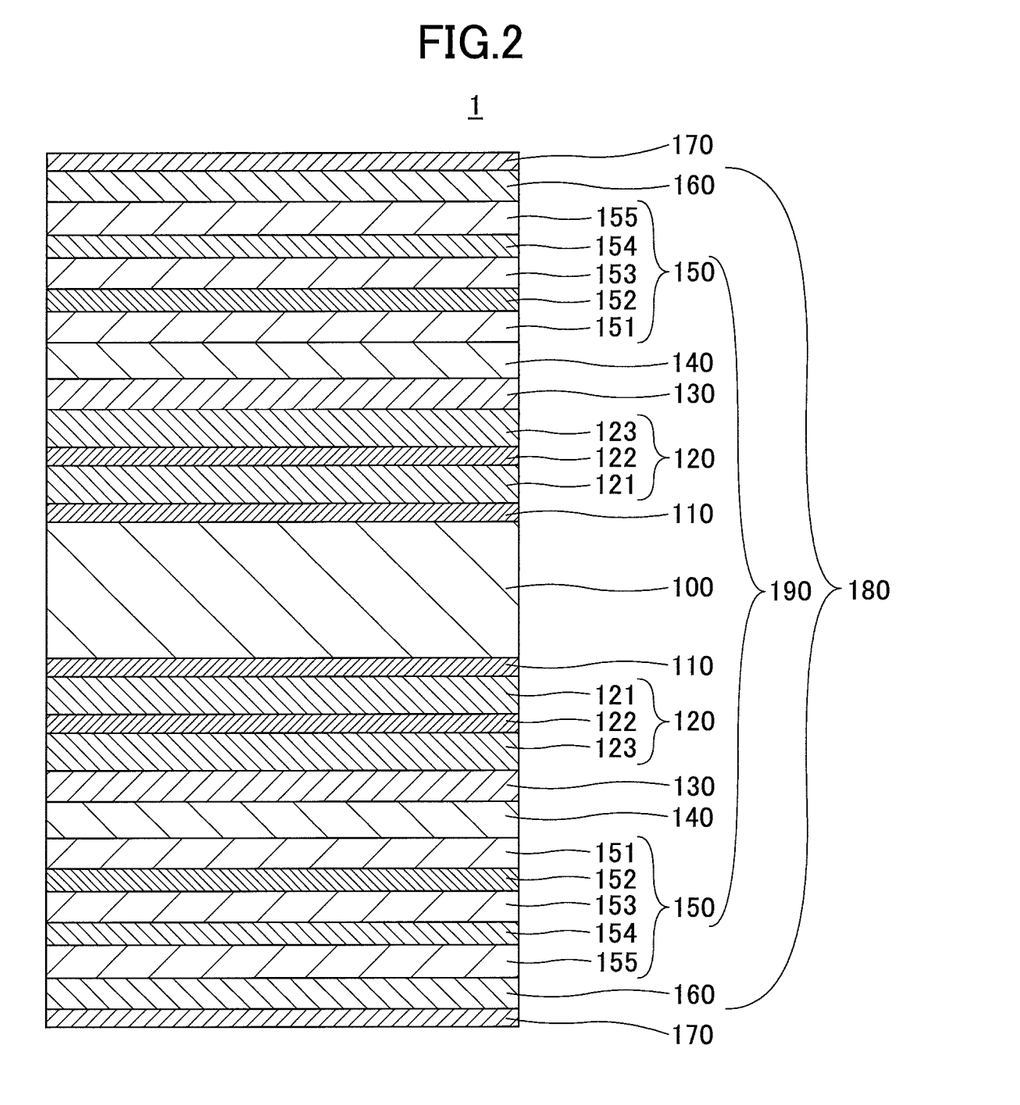
FIG. 2 is a cross sectional view illustrating an example of a magnetic recording medium fabricated by the fabrication apparatus illustrated in FIG. 1.

FIG. 2 is a cross sectional view illustrating an example of a magnetic recording medium 1 fabricated by the fabrication apparatus illustrated in FIG. 1. A data recording system with respect to the magnetic recording medium 1 may be an in-plane (or longitudinal) recording system or a perpendicular recording system, however, it is assumed for the sake of convenience that the magnetic recording medium 1 in this embodiment employs the perpendicular recording system.

The magnetic recording medium 1 may include a substrate 100, a bonding layer 110 formed on the substrate 100, a soft magnetic underlayer 120 formed on the bonding layer 110, an orientation control layer 130 formed on the soft magnetic underlayer 120, a nonmagnetic underlayer 140 formed on the orientation control layer 130, a perpendicular recording layer 150 formed on the nonmagnetic underlayer 140, a protection layer 160 formed on the perpendicular recording layer 150, and a lubricant layer 170 formed on the protection layer 160. The perpendicular recording layer 150 is an example of a magnetic recording layer. In this embodiment, the magnetic recording medium 1 has a configuration in which the bonding layer 110, the soft magnetic underlayer 120, the orientation control layer 130, the nonmagnetic underlayer 140, the perpendicular recording layer 150, the protection layer 160, and the lubricant layer 170 are formed on both sides of the substrate 100. In FIG. 2, a stacked structure in which the bonding layer 110 up to the protection layer 160 are stacked on both sides of the substrate 100, that is, the stacked structure in which all of the layers of the magnetic recording medium 1 except the lubricant layer 170 are formed on both sides of the substrate 100, forms a stacked body 180. Further, in FIG. 2, a stacked structure in which the bonding layer 110 up to the perpendicular recording layer 150 are stacked on both sides of the substrate 100, that is, the stacked structure in which all of the layers of the magnetic recording medium 1 except the protection layer 160 and the lubricant layer 170 are formed on both sides of the substrate 100, forms a stacked body 190.

In this embodiment, the substrate 100 may be made of a nonmagnetic material. For example, the substrate 100 may be formed by a metal substrate made of a metal material such as aluminum, aluminum alloy, and the like. For example, the substrate 100 may be formed by a nonmetallic substrate made of a nonmetallic material such as glass, ceramics, silicon, silicon carbide, carbon, and the like. In addition, the substrate 100 may have a NiP layer or a NiP alloy layer, formed on the surface of the metal substrate or the nonmetallic substrate, by plating, sputtering, or the like.

For example, the glass substrate may also be made of float glass, glass ceramics, and the like. For example, general-purpose soda-lime glass, aluminosilicate glass, and the like may be used for the flat glass. In addition, lithium glass ceramics, and the like, for example, may be used for the glass ceramics. Further, a sintered body having general-purpose aluminum oxide, aluminum nitride, silicon nitride, or the like as its main component, or a fiber reinforced material of such materials, for example, may be used for the ceramic substrate.

Corrosion of the substrate 100 may progress due to the effects of adsorbed gas or moisture on the surface, diffusion of the substrate component, and the like when the substrate 100 makes contact with the soft magnetic underlayer 120 having Co or Fe as its main component as will be described later. For this reason, the bonding layer 110 may preferably be provided between the substrate 100 and the soft magnetic underlayer 120. The material used for the bonding layer 110 may suitably be selected from Cr, Cr alloy, Ti, Ti alloy, and the like, for example. The bonding layer 110 may preferably have a thickness of 2 nm (20 Å) or greater.

The soft magnetic underlayer 120 may be provided to reduce noise at the time of recording and reproduction, in a case in which the perpendicular recording system is employed. In this embodiment, the soft magnetic underlayer 120 may include a first soft magnetic layer 121 formed on the bonding layer 110, a spacer layer 122 formed on the first soft magnetic layer 121, and a second soft magnetic layer 123 formed on the spacer layer 122. In other words, the soft magnetic underlayer 120 may have a structure in which the spacer layer 122 is sandwiched between the first soft magnetic layer 121 and the second soft magnetic layer 123.

The first soft magnetic layer 121 and the second soft magnetic layer 123 may preferably be made of a material including Fe:Co in a range of 40:60 to 70:30 in atomic ratio (at %). In order to improve the permeability and corrosion resistance, the first soft magnetic layer 121 and the second soft magnetic layer 123 may preferably include an element selected from a group consisting of Ta, Nb, Zr, and Cr in a range of 1 at % to 8 at %. In addition, the spacer layer 122 may be made of Ru, Re, Cu, or the like, and may preferably be made of Ru in particular.

The orientation control layer 130 may be provided to improve the recording and reproducing characteristics, by reducing crystal grain sizes of the perpendicular recording layer 150 that is formed via the nonmagnetic underlayer 140. The material used for the orientation control layer 130 is not limited to a particular material, however, a material having a hcp structure, a fcc structure, or an amorphous structure may preferably be used for the orientation control layer 130. The orientation control layer 130 may preferably be made of an Ru alloy, Ni alloy, Co alloy, Pt alloy, or Cu alloy in particular, and the orientation control layer 130 may have a multi-layer structure in which such alloys are stacked. For example, a multi-layer structure formed by Ni alloy and Ru alloy, a multi-layer structure formed by Co alloy and Ru alloy, or a multi-layer structure formed by Pt alloy and Ru alloy, may preferably be formed from the side of the substrate 100.

The nonmagnetic underlayer 140 may be provided to suppress disturbance in crystal growth at an initial stacked part of the perpendicular recording layer 150 that is stacked on the nonmagnetic underlayer 140, and to suppress noise generation at the time of the recording and reproduction. However, the nonmagnetic underlayer 140 may be omitted.

In this embodiment, the nonmagnetic underlayer 140 may preferably be made of a material including a metal having Co as its main component, and additionally including an oxide. A Cr-content of the nonmagnetic underlayer 140 may preferably be in a range of 25 at % to 50 at %. For example, the oxide included in the nonmagnetic underlayer 140 may preferably be an oxide of Cr, Si, Ta, Al, Ti, Mg, Co, or the like. $TiO_2$, $Cr_2O_3$, $SiO_2$, or the like may particularly be preferable for use as the oxide included in the nonmagnetic underlayer 140. The oxide-content of the nonmagnetic underlayer 140 may preferably be in a range of 3 mol % to 18 mol %, with respect to a mol total calculated by regarding an alloy of Co, Cr, Pt, or the like, for example, forming the magnetic grains (or particles), as one compound.

In this embodiment, the perpendicular recording layer 150 may include a first magnetic layer 151 formed on the nonmagnetic underlayer 140, a first nonmagnetic layer 152 formed on the first magnetic layer 151, a second magnetic layer 153 formed on the first nonmagnetic layer 152, a second nonmagnetic layer 154 formed on the second magnetic layer 153, and a third magnetic layer 155 formed on the second nonmagnetic layer 154. In other words, in the perpendicular recording layer 150, the first nonmagnetic layer 152 is sandwiched between the first magnetic layer 151 and the second magnetic layer 153, and the second nonmagnetic layer 154 is sandwiched between the second magnetic layer 153 and the third magnetic layer 155.

The first magnetic layer 151, the second magnetic layer 153, and the third magnetic layer 155 may be provided to store data by inverting the magnetization direction in a direction taken along the thickness of the perpendicular recording layer 150 by the magnetic energy supplied from a magnetic head 3 (illustrated in FIG. 3 which will be described later) and maintaining the state of the magnetization. The first magnetic layer 151, the second magnetic layer 153, and the third magnetic layer 155 may form the magnetic layer of this embodiment.

The first magnetic layer 151, the second magnetic layer 153, and the third magnetic layer 155 may preferably include metal magnetic grains having Co as its main component, and a nonmagnetic oxide, and have a granular structure in which the magnetic grains are surrounded by the oxide.

For example, the oxide included in the first magnetic layer 151, the second magnetic layer 153, and the third magnetic layer 155 may preferably be Cr, Si, Ta, Al, Ti, Mg, Co, or the like. $TiO_2$, $Cr_2O_3$, $SiO_2$, or the like may particularly be preferable for use as the oxide included in the first magnetic layer 151, the second magnetic layer 153, and the third magnetic layer 155. In addition, the lowermost first magnetic layer 151 of the perpendicular recording layer 150 may preferably include a complex (or composite) oxide made up of two or more kinds of oxides. The complex oxide included in the first magnetic layer 151 may preferably be $Cr_2O_3$—$SiO_2$, $Cr_2O_3$—$TiO_2$, $Cr_2O_3$—$SiO_2$—$TiO_2$, or the like.

In addition, the material used for the magnetic grains of the first magnetic layer 151, the second magnetic layer 153, and the third magnetic layer 155 may preferably include compositions such as 90(Co14Cr18Pt)-10($SiO_2$) {mol concentration of 90 mol % calculated using magnetic particles having a Cr-content of 14 at %, a Pt-content of 18 at %, and the remainder Co as one compound, and 10 mol % of an oxide component having $SiO_2$}, 92(Co10Cr16Pt)-8($SiO_2$), 94(Co8Cr14Pt4Nb)-6($Cr_2O_3$) (CoCrPt)—($Ta_2O_5$), (CoCrPt)—($Cr_2O_3$)—($TiO_2$) (CoCrPt)—($Cr_2O_3$) ($SiO_2$), (CoCrPt)—($Cr_2O_3$)—($SiO_2$)—($TiO_2$)/(CoCrPtMo)—(Ti), (CoCrPtW)—($TiO_2$), (CoCrPtB)—($Al_2O_3$), (CoCrPtTaNd)—(MgO), (CoCrPtBCu)—($Y_2O_3$), (CoCrPtRu)—($SiO_2$), and the like.

The first nonmagnetic layer 152 and the second nonmagnetic layer 154 may be provided to facilitate the magnetic inversion in each of the magnetic layers, namely, the first magnetic layer 151, the second magnetic layer 153, and the third magnetic layer 155 forming the perpendicular recording layer 150, and to reduce noise by reducing variance of the magnetic inversions of the magnetic particles as a whole. In this embodiment, the first nonmagnetic layer 152 and the second nonmagnetic layer 154 may preferably include Ru and Co, for example.

In the example illustrated in FIG. 2, the perpendicular recording layer 150 includes magnetic layers (first, second, and third magnetic layers 151, 153, and 155) forming the 3-layer structure, however, the structure of the magnetic layers is not limited to the 3-layer structure, and the magnetic layers may form a multi-layer structure of four (4) or more layers. In addition, although a nonmagnetic layer (a corresponding one of first and second nonmagnetic layers 152 and 154) is interposed between two adjacent magnetic layers (two adjacent ones of first, second, and third magnetic layers 151, 153, and 155) forming the perpendicular recording layer 150, the structure of the magnetic layers forming the perpendicular recording layer 150 is not limited to such a structure. For example, the perpendicular recording layer 150 may have a structure in which two magnetic layers having mutually different compositions are stacked.

The protection layer 160 may be provided to prevent corrosion of the perpendicular recording layer 150, and to prevent damage to the medium surface or the magnetic head 3 itself when the magnetic head 3 and the magnetic recording medium 1 make contact. The protection layer 160 may be provided to also improve the corrosion resistance of the magnetic recording medium 1.

The protection layer 160 may be made of a known material. The protection layer 160 may be made of a material including C, $SiO_2$, or $ZrO_2$, for example. From the standpoint of maintaining the hardness of the protection layer 160 and making the protection layer 160 relatively thin, the protection layer 160 may preferably be made of amorphous hard carbon or DLC (Diamond Like Carbon). Furthermore, from the standpoint of realizing a high recording density, the protection layer 160 may preferably have a thickness of 1 nm to 10 nm, for example, in order to reduce the distance between the magnetic head 3 and the magnetic recording medium 1 in a magnetic storage apparatus, which will be described later in conjunction with FIG. 3.

The lubricant layer 170 may be provided to suppress friction between the magnetic head 3 and the surface of the magnetic recording medium 1 when the magnetic head 3 makes contact with the magnetic recording medium 1, and to improve the corrosion resistance of the magnetic recording medium 1. The lubricant layer 170 may be made of a known material. The lubricant layer 170 may preferably be made of a lubricant such as perfluoropolyether, fluorinated alcohol, fluorinated carboxylic acid, or the like, for example. From the standpoint of realizing a high recording density, the lubricant layer 170 may preferably have a thickness of 1 nm to 2 nm, for example, in order to reduce the distance between the magnetic head 3 and the magnetic recording medium 1 in the magnetic storage apparatus, which will be described later in conjunction with FIG. 3.

When forming the lubricant layer 170 by the vapor-phase lubrication deposition, the lubricant is heated to a temperature in a range of 90° C. to 150° C., and vapor of the lubricant is introduced into the reaction chamber. The pressure within the reaction chamber is set to approximately 10 Pa, for example, and an exposure time of the stacked body in the reaction chamber is set to approximately 10 seconds, for example, in order to form the lubricant layer 170 on the surface of the protection layer 160 to a thickness of approximately 1 nm, for example.

Figure 3:
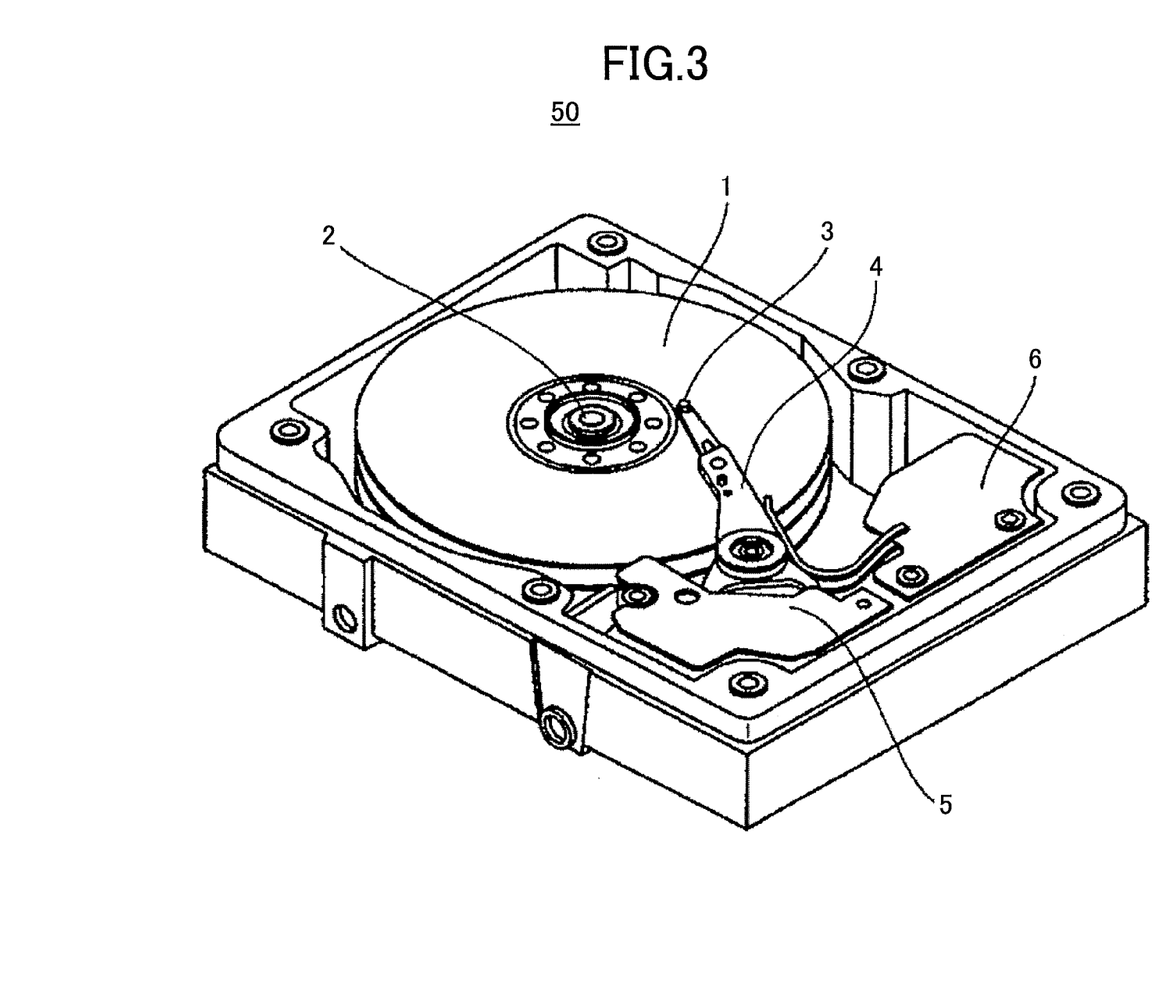
FIG. 3 is a perspective view illustrating an example of a configuration of a magnetic storage apparatus having the magnetic recording medium fabricated in one embodiment of the present invention.

FIG. 3 is a perspective view illustrating an example of a configuration of the magnetic storage apparatus having the magnetic recording medium 1 fabricated in this embodiment of the present invention.

A magnetic storage apparatus 50 illustrated in FIG. 3 may be provided with the magnetic recording medium 1 that magnetically records data, a rotary driving part 2 that rotationally drives the magnetic recording medium 1, the magnetic head 3 that writes (or records) data to and reads (or reproduces) the data from the magnetic recording medium 1, a carriage 4 mounted with the magnetic head 3, a head driving part 5 that moves the magnetic head 3 via the carriage 4 relative to the magnetic recording medium 1, and a signal processor 6. The signal processor 6 may subject data input from an external host unit (not illustrated) or the like to a known signal processing, in order to supply recording signals suited for the recording on the magnetic recording medium 1 to the magnetic head 3. The signal processor 6 may subject the signals read from the magnetic recording medium 1 by the magnetic head 3 to a known signal processing, and output reproduced data to the external host unit or the like.

In the example illustrated in FIG. 3, the magnetic recording medium 1 is a magnetic disk having a disk shape. The magnetic disk includes a magnetic recording layer to record the data, on at least one of the two sides (or surfaces) of the magnetic disk. The magnetic recording layer may be provided on both sides (or both surfaces) of the magnetic disk, as illustrated in FIG. 2. Further, in the example illustrated in FIG. 3, a plurality of magnetic recording media (in this example, three (3) magnetic recording media) are provided in the magnetic storage apparatus 50. However, the number of magnetic recording media 1 provided in the magnetic storage apparatus 50 may be one (1) or greater.

According to the embodiment described above, the bonded ratio of the lubricant layer that is formed is high and falls within a suitable range with respect to the surface of the protection layer, and the lubricant layer that is formed includes a suitable free layer. In addition, the lubricant layer can provide a high coverage of the surface of the protection layer. For this reason, a magnetic recording medium having a high reliability and a high corrosion resistance can be obtained, and the reliability of the magnetic storage apparatus can be improved.

Further, the present invention is not limited to the embodiment, but various variations and modifications may be made without departing from the scope of the present invention.

First Practical Example PE1

Next, a description will be given of a practical example PE1 in which a magnetic recording medium is fabricated by the following fabrication method. More particularly, the magnetic recording medium is fabricated using the fabrication apparatus illustrated in FIG. 1. First, a cleaned glass substrate (manufactured by Konica Minolta, Inc. and having an outer diameter of 2.5 inches) is accommodated within the airlock chamber 12 of the fabrication apparatus illustrated in FIG. 1, and thereafter placed into the carrier 925 using the vacuum robot 111, in order to form stacked layers on the substrate surface. The inside of the deposition chambers are decompressed (or evacuated) to a vacuum (or base pressure) of $1 \times 10^{-5}$ Pa.

Next, a bonding layer having a thickness of 10 nm is deposited on the glass substrate within the process chamber 905 in which the argon gas pressure is 1 Pa, using a 60Cr-50Ti target. In addition, a first soft magnetic layer having a thickness of 34 nm is deposited on the bonding layer within the process chamber 906 in which the argon gas pressure is 1 Pa and the substrate temperature is 100° C. or lower, using a 46Fe-46Co-5Zr-3B {Fe-content of 46 at %, Co-content of 46 at %, Zr-content of 5 at %, and B-content of 3 at %} target. In addition, an Ru layer having a thickness of 0.76 nm is deposited on the first soft magnetic layer within the process chamber 908, using an Ru target. Further, a second soft magnetic layer having a thickness of 34 nm is deposited on the Ru layer within the process chamber 909, using a 46Fe-46Co-5Zr-3B target. The first and second soft magnetic layers sandwiching the Ru layer are formed as the soft magnetic underlayer.

Next, a first underlayer having a thickness of 5 nm is deposited on the soft magnetic underlayer within the process chamber 910 in which the argon gas pressure is 1 Pa, using a Ni-6W {W-content of 6 at %, and the remainder Ni} target. A second underlayer having a thickness of 10 nm is deposited on the first underlayer within the process chamber 911, using an Ru target. A third underlayer having a thickness of 10 nm is deposited within the process chamber 912 in which the argon gas pressure is 8 Pa, using an Ru target. An underlayer having a 3-layer structure is formed by the first, second, and third underlayers.

Next, a magnetic layer having a multi-layer structure is deposited on the underlayer having the 3-layer structure. More particularly, a 91(72Co6Cr16Pt6Ru)-4SiO$_2$-3Cr$_2$O$_3$-2TiO$_2$ layer having a thickness of 6 nm is deposited on the third underlayer within the process chamber 913 in which the argon gas pressure is 1 Pa. In addition, a 91(65Co12Cr13Pt10Ru)-4SiO$_2$-3Cr$_2$O$_3$-2TiO$_2$ layer having a thickness of 6 nm is deposited on the 91(72Co6Cr16Pt6Ru)-4SiO$_2$-3Cr$_2$O$_3$-2TiO$_2$ layer within the process chamber 915 in which the argon gas pressure is 1 Pa. Further, a 63Co15Cr16Pt6B layer having a thickness of 3 nm is deposited on the 91(65Co12Cr13Pt10Ru)-4SiO$_2$-3Cr$_2$O$_3$-2TiO$_2$ layer within the process chamber 916 in which the argon gas pressure is 1 Pa.

Next, a carbon protection layer having a thickness of 2.5 nm is deposited on the magnetic layer within the process chambers 918 and 919, using an ion beam, in order to obtain the stacked body (or magnetic recording medium). The base pressure within the process chambers 918 and 919 is $1 \times 10^{-5}$ Pa, a mixture gas in which 4% methane is mixed to hydrogen gas is used for the process gas, and the process gas pressure (P1) is 8 Pa. The chambers 920 and 921 are used as auxiliary chambers, and no process gas is supplied to the auxiliary chambers, and the base pressure within the auxiliary chambers is $1 \times 10^{-5}$ Pa.

The stacked body that is obtained is removed from the carrier 925 by the vacuum robot 112, and is supplied into the vapor-phase lubrication deposition apparatus 102 via the airlock chamber 13 by the vacuum robot 941. The base pressure within the isolation chamber 943, the vapor-phase lubrication process chamber 944, the airlock chamber 945, and the return path chamber 947 is set to $1\times10^{-5}$ Pa. In addition, argon gas is supplied into the isolation chamber 943 at 50 Pa, diol (molecular mass: 1000, heating temperature: 110° C.) gas represented by the following generalized formula (9) is supplied into the vapor-phase lubrication process chamber 944 at 20 Pa, and no process gas is supplied to the airlock chamber 945 and the return path chamber 947. A first lubricant formed by diol is formed to a thickness of 17 Å on the surface of the stacked body by the vapor-phase lubrication deposition apparatus 102.

$$HOCH_2-CF_2O-(C_2F_4O)_p-(CF_2O)_q-CH_2OH \quad (9)$$

The stacked body having the first lubricant formed thereon by the vapor-phase lubrication deposition is transported outside the fabrication apparatus using the substrate output robot 946.

Next, a second lubricant is coated on the stacked body by dipping.

First, A20H-DD (product name) manufactured by MORESCO Corporation is used as a first compound and Fomblin Z-TETRAOL (product name) manufactured by Solvay Solexis, Inc. is used as a second compound, and the lubricant layer-forming solution is adjusted by mixing the first and second compounds so that a mass ratio (A/B) of the first compound (A) with respect to the second compound (B) becomes 0.1.

Vertrel XF (product name) manufactured by Du Pont-Mitsui Fluorochemicals Co., Ltd. is used as a solvent for dissolving the lubricant layer-forming solution. In addition, the concentration of each lubricant (compound A and compound B) within the lubricant layer-forming solution is 0.3 mass %.

Next, the lubricant layer-forming solution is supplied to a dipping bath of a dip-coating apparatus, and the stacked body described above is dipped into the dipping bath. Then, the stacked body is lifted from the dipping bath at a predetermined velocity, in order to coat the lubricant layer-forming solution and form the lubricant layer. An average thickness of the lubricant layer that is obtained is 17 Å. Analysis of the coated lubricant layer revealed that approximately 90% of the lubricant layer is formed by the second lubricant, and the remaining approximately 10% of the lubricant layer is formed by the first lubricant.

The A20H-DD is a compound in which x is 4, $R_1$ is $CF_3$, and $R_2$ is a substituent of an end group —CH(OH)CH$_2$OH in the following generalized formula (10).

$(R_2)_{6-x}$ —[O(C$_6$H$_4$)R$_1$]$_x$ (10)

In addition, the Fomblin Z-TETRAOL is a compound represented by the following generalized formula (11), where the molecular mass is 3000.

$$HOCH_2CH(OH)-CH_2OCH_2CF_2O-(C_2F_4O)_r-$$
$$(CF_2O)_s-CF_2CH_2OCH_2-CH(OH)CH_2OH \quad (11)$$

First Comparison Example CE1

The magnetic recording medium in a first comparison example CE1 is fabricated similarly to the first practical example PE1. However, in the first comparison example CE1, no second lubricant is deposited, and the lubricant layer is formed solely of the first lubricant. The thickness of the lubricant layer is 17 Å.

Second Comparison Example CE2

The magnetic recording medium in a second comparison example CE2 is fabricated similarly to the first practical example PE1. However, in the second comparison example CE2, no first lubricant is deposited, and the lubricant layer is formed solely of the second lubricant. The thickness of the lubricant layer is 17 Å.

(Evaluation of Bonded Ratio of Lubricant Layer)

The bonded ratios of the magnetic recording media in the first practical example PE1 and the first and second comparison examples CE1 and CE2 are measured. The bonded ratio is measured by dipping the magnetic recording medium formed with the lubricant layer in a fluorocarbon solvent for five (5) minutes, and measuring the absorbance in a vicinity of 1270 cm$^{-1}$ at the same position on the same medium before and after the dipping using ESCA. The bonded ratio is defined as a percentage of the ratio of the absorbances before and after the dipping, that is, by [{(Absorbance After Dipping)/(Absorbance Before Dipping)}×100]. Vertrel XF (product name) manufactured by Du Pont-Mitsui Fluorochemicals Co., Ltd. is used for the fluorocarbon solvent. Evaluation results of the bonded ratios are illustrated in Table 1.

TABLE 1

|  | Bonded Ratio (%) | Si Adsorption Number | Lubrication Pickup |
| --- | --- | --- | --- |
| PE1 | 90 | 5 | Slight or None |
| CE1 | 85 | 150 | Slight or None |
| CE2 | 85 | 10 | YES |

(Evaluation of Resistance to Environment)

The resistance to environment of the magnetic recording media in the first practical example PE1 and the first and second comparison examples CE1 and CE2 are evaluated according to the following method. The method of evaluating the resistance to environment hereunder is one method of checking contamination of the magnetic recording medium caused by an environmental substance that generates a contamination substance under a high temperature environment. In the evaluation of the resistance to environment described hereunder, Si ions are used as the environmental substance that generates the contamination substance under the high temperature environment, and an Si adsorption number is measured as the amount of the contamination substance that is generated by the environmental substance and is contaminating the magnetic recording medium.

More particularly, the magnetic recording medium that is the evaluation target is first held in a high temperature environment in which the temperature is 85° C. and the humidity is 0% for 240 hours under existence of siloxane Si rubber.

Next, the Si adsorption number at the surface of the magnetic recording medium is analyzed and measured using tof-SIMS (time of flight-Secondary Ion Mass Spectrometry), and the extent of the contamination caused by the Si ions, that is, the environmental substance, under the high temperature environment, is evaluated. Evaluation results of the Si adsorption numbers are illustrated in Table 1 above. The higher the Si adsorption number, the more easily the magnetic recording medium is contaminated and the more deteriorated (or the lower) the coverage of the surface of the protection layer is by the lubricant layer.

The evaluation of the Si adsorption number is made by setting the extent of the Si ion contamination for a reference disk to one (1), where the reference disk is not subjected to a high-temperature process and is formed with a lubricant layer made of Fomblin Z-TETRAOL (product name) manufactured by Solvay Solexis, Inc. and having a thickness of 17 Å on the stacked body having each of the layers up to the protection layer formed on the nonmagnetic substrate.

The lubricant pickup of the magnetic recording media in the first practical example PE1 and the first and second comparison examples CE1 and CE2 is evaluated, by making a head slider (or magnetic head) seek on the surface of the magnetic recording media for a predetermined time, and confirming the existence of the lubricant adhered on the head slider by a light microscope. More particularly, the magnetic recording media are rotated at 1000 rpm which is lower than the regular rotational speed, and the head slider is made to seek on the surface of the magnetic recording media. The seek velocity is 2 Hz, and the seek time is 24 hours. The existence of the lubricant adhered on the head slider is confirmed using a DIC (Differential Interference Contrast) microscope with a magnification of 600 times. The evaluation results of the lubricant pickup are illustrated in Table 1 above.

It may be confirmed from Table 1 that the bonded ratios of the first and second comparison examples CE1 and CE2 are both 85%, however, the Si adsorption is high and the coverage of the surface of the protection layer by the lubricant layer is low in the first comparison example CE1, while the lubricant pickup exists in the second comparison example CE2. On the other hand, it may be confirmed from Table 1 that the bonded ratio of the first practical example PE1 is 90%, the Si adsorption is low and the coverage of the surface of the protection layer by the lubricant layer is satisfactory, and the lubricant pickup only slightly exists or does not exist. Therefore, it may be confirmed that, according to the first practical example PE1, the bonded ratio of the lubricant layer with respect to the surface of the protection layer is within a suitable range and high, the lubricant pickup is suppressed although a suitable free layer is included in the lubricant layer, and the coverage of the surface of the protection layer by the lubricant layer is high.

According to the embodiments and practical example described above, it is possible to simultaneously obtain a low coefficient of friction of the lubricant layer and a high coverage of the surface of the protection layer by the lubricant layer.

Further, the present invention is not limited to these practical examples, but various variations and modifications may be made without departing from the scope of the present invention.

What is claimed is:

1. A method of fabricating a magnetic recording medium by sequentially forming a magnetic recording layer, a protection layer, and a lubricant layer on a stacked body, comprising:
    forming the lubricant,
    wherein the forming the lubricant includes
        depositing a first lubricant on the stacked body after forming the protection layer, by vapor-phase lubrication deposition, without exposing the stacked body to atmosphere; and
        depositing a second lubricant that is dissolved in an organic solvent onto the stacked body after depositing the first lubricant by substituting the first lubricant in part or in its entirety by the second lubricant so that the second lubricant in part or in its entirety is deposited directly on the protection layer so that approximately 90% to 100% of the lubricant layer is formed by the second lubricant, and the remaining approximately 0 to 10% of the lubricant layer is formed by the first lubricant.

2. The method of fabricating the magnetic recording medium as claimed in claim 1, wherein a molecular mass of a compound included in the second lubricant is higher than a molecular mass of a compound included in the first lubricant.

3. The method of fabricating the magnetic recording medium as claimed in claim 1, where the first lubricant includes a diol having a molecular mass within a range of 500 to 2000.

4. The method of fabricating the magnetic recording medium as claimed in claim 1, wherein the second lubricant includes a tetraol having a molecular mass within a range of 1500 to 5000.

5. The method of fabricating the magnetic recording medium as claimed in claim 1, wherein the second lubricant includes a plurality of compounds.

6. The method of fabricating the magnetic recording medium as claimed in claim 1, wherein a bonded ratio between the protection layer and the lubricant layer is within a range of 60% to 99%.

7. The method of fabricating the magnetic recording medium as claimed in claim 3, wherein a molecular mass of a compound included in the second lubricant is higher than a molecular mass of a compound included in the first lubricant.

8. The method of fabricating the magnetic recording medium as claimed in claim 3, wherein the second lubricant includes a tetraol having a molecular mass within a range of 1500 to 5000.

9. The method of fabricating the magnetic recording medium as claimed in claim 3, wherein a bonded ratio between the protection layer and the lubricant layer is within a range of 60% to 99%.

* * * * *